Patented Dec. 14, 1943

2,336,793

UNITED STATES PATENT OFFICE 2,336,793

CONVERSION OF HYDROCARBONS

Edwin T. Layng, Jersey City, and Louis C. Rubin, West Caldwell, N. J., and Robert F. Ruthruff, Chicago, Ill., assignors to The Polymerization Process Corporation, Jersey City, N. J., a corporation of Delaware No Drawing. Application February 29, 1940, Serial No. 321,520

8 Claims. (Cl. 260—683.15)

This invention relates to the conversion of olefinic hydrocarbons to hydrocarbons of higher boiling points by means of catalytic contact material. More particularly, the invention relates to the conversion of olefinic hydrocarbons by means of metal pyrophosphate contact agents of improved characteristics.

Certain metal pyrophosphates, including those of copper, mercury, zinc, magnesium, iron, aluminum and cobalt are capable of promoting the conversion of olefins to higher boiling hydrocarbon products. Such pyrophosphates are advantageously employed in the form of granular masses, the granules being formed by crushing the filter cake, if the pyrophosphate is obtained by precipitation, or by pelleting or extrusion of a more finely divided mixture. Pyrophosphates are employed in the granular form in order that the fluid reactants may be passed through a granular mass of the catalytic material at relatively high velocity, and without excessive pressure drop.

Each of the pyrophosphates of the metals mentioned above becomes active in the promotion of the conversion reactions by the formation therein, under the conversion conditions employed, of an active modification which is probably the true catalyst for the reaction. Formation of the active modification probably involves reduction reactions such as, in the case of copper pyrophosphate, reduction of the copper from the cupric to the cuprous state.

It is found that during the conversion treatment the granules become softened whereby they collapse or disintegrate. This is probably due to the fact that the reactions which result in the formation of the active modification affect the material which forms the structure of the granules. Consequently, during the conversion treatment, the body of catalytic material employed tends to consolidate gradually whereby the pressure drop through the conversion chamber is increased. Consolidation of the granular catalytic material through collapse and disintegration of the granules may result in the accumulation, within the body of catalytic material, of relatively high boiling conversion products which are less easily removed by the flow of the fluid reactants due to the decrease in the velocity of the reactants in their passage through the body of catalytic material. Such deposits decrease the number of active centers in the catalytic material with the result that the conversion rate is decreased. As a result of the increase in pressure drop and the decrease in conversion rate the conversion treatment must be terminated before it would be necessary, if the granular mass of catalytic material did not become softened with resulting collapse and disintegration.

It is an object of the present invention to prepare catalytic contact material comprising as an active ingredient one or more of the above-mentioned pyrophosphates in the form of a granular mass which is less susceptible to collapse and disintegration than is the granular catalytic material consisting only of the pyrophosphates.

It is a further object of the invention to provide a method for the conversion of olefinic hydrocarbons to hydrocarbons of higher boiling points by the passage thereof over a granular catalytic material which retains its shape during the conversion operation with the result that operating runs of longer duration are made possible but at the same rates of conversion as would be obtained in the presence of a granular catalytic material consisting of the said metal pyrophosphates.

It is a further object of the invention to provide a method of preparing a catalytic material comprising as an essential ingredient one or more of the active pyrophosphates in the form of granules which are less susceptible to softening and collapse or disintegration during the conversion treatment than are granules consisting only of the pyrophosphates.

In accordance with the present invention one or more of the active pyrophosphates are incorporated in a granular mass containing large proportions of a suitable supporting material.

As used herein the expression "granular mass" refers to a mixture of a multiplicity of granules in which the individual granules may be naturally occurring materials or materials produced by crushing of larger pieces of naturally occurring material of the desired size. The granules may also be preformed, as by the vitrification of a mass of fine particles or by the use of a binder to form the particles into the granular form. The granular mass may be uniform in character in that all the individual granules thereof are of substantially the same composition, or it may consist of a mixture of granules of supporting material and granules of pyrophosphate, or it may consist of a mixture of granules of supporting material and granules which include both supporting material and pyrophosphate.

In the selection of a supporting material it is necessary to avoid the use of materials which would react with the pyrophosphate employed as an essential active ingredient of the catalytic material. The supporting material furthermore should not be otherwise reactive under the conditions of operation.

In addition to these general requirements it has been discovered in connection with the present invention that the supporting material selected should not be reactive with the modifications of the pyrophosphates which are formed during the conversion reaction; which modifications probably are reduction products and are apparently the true catalysts for the conversion reaction. This requirement for the supporting material necessitates avoiding the use of large classes of materials which have been previously suggested for use as supporting materials in connection with polymerization catalysts.

Materials which have been found suitable as supporting material in accordance with the foregoing requirements include normal and acid salts of ortho-, pyro-, and meta-phosphoric acids which are not substantially reducible under the conversion conditions such as the phosphates of calcium, strontium, barium, titanium, zirconium, cerium, thorium, silicon, germanium, tin and lead.

In addition to the phosphates other suitable salts may be employed such as certain metal sulphates, including barium sulphate and calcium sulphate.

In addition to the foregoing materials it is found that carbonaceous materials are particularly suitably as supporting materials because of their stability under the conditions of operation, their relative porosity, and ease with which they may be obtained as, or preformed into, granules of the desired size and porosity. Suitable materials include various charcoals and cokes as well as materials which may be converted by relatively mild heating to the desired nonvolatile form, such as petroleum residues and asphalts.

In the selection of any of these supporting materials, however, care must be exercised to avoid the presence of impurities which would react with the active modification of the metal pyrophosphates employed, such as metals or oxides of metals, especially those of the alkali and alkaline earth series.

The production of the catalytic material may comprise the admixture of one or more of the active pyrophosphates with a granular mass of the supporting material. The pyrophosphate may be in the form of granules which are supported against disintegration and collapse by contact with adjoining granules of supporting material, or the pyrophosphate may be comminuted and then mixed with the granules of supporting material as a powder or a slurry. In the resulting mass the fine particles of pyrophosphate are held in the interstices of the structure provided by the consolidated mass of granules of supporting material while the latter also provides the porosity necessary to permit easy passage of the fluid reactants. Preformed carbonaceous granules such as granulated wood charcoal or granulated petroleum coke constitute excellent supporting material for use in this method of preparation because the structural strength of the granules resists the disintegrating effect of the mixing operation. As stated above, the porous granular material and the active pyrophosphate in powder form may be intimately mixed in the dry state. Adhesion of a portion of the pyrophosphate to the granules may be promoted by preliminary moistening of the latter prior to the mixing operation, which is then followed by suitable drying to remove moisture. Preferably, however, the active pyrophosphate may be formed into a slurry which is then mixed with the granular supporting material to effect the desired deposition of pyrophosphate on the surfaces of the supporting material. After settling the excess water may then be removed by decantation after which the resulting mixture is dried, or the excess water may be removed by evaporation. The relative proportions of active pyrophosphate and supporting material to be employed in these methods of production of the contact material may be varied in accordance with the methods employed and the physical character of the supporting material. However, the amount of active pyrophosphate in the finished catalytic contact material should be not substantially lower than 25% by weight.

Preferably, however, the improved catalytic material is prepared in the form of granules containing substantial proportions of both the pyrophosphate and the supporting material, the latter serving to give to the granule the structural rigidity necessary to retain the shape of the granule in spite of any chemical change undergone by the pyrophosphate during and substantially throughout the conversion treatment.

The formation of granules including the pyrophosphate and the supporting material may be effected by precipitation of the metal pyrophosphate on preformed granules of the supporting material. In this method the granules of supporting material are impregnated with one of the solutions necessary to precipitate the pyrophosphate, that is, a solution of a soluble pyrophosphate or a solution of a soluble salt of the desired metal, and are thereafter impregnated with the other solution in order to effect precipitation of the desired metal pyrophosphate within and upon the surface of the granules of supporting material. Suitable variation of the manipulative details of this procedure may be necessary to effect deposition of a sufficient quantity of the pyrophosphate in and on the supporting material depending upon the porosity and absorptive characteristics of the supporting material. The amount of active pyrophosphate in the finished catalytic material should not be substantially lower than 25% by weight.

The formation of granules containing both supporting material and active pyrophosphate may also be effected by employing materials which may be converted by the application of heat to the desired supporting material. Such materials include asphalts, tars, residual sludges, sugars, etc., which may be dried and/or decomposed to form a carbonaceous supporting material which is substantially free from materials volatile under the reaction conditions. In the use of these materials the metal pyrophosphate is admixed therewith, and the resulting mixture is heated, to drive off volatile matter and, if necessary, to effect decomposition, to produce the supporting material in the desired form. The resulting mixture may be broken into granules of the desired size or the heating may be preceded by pelleting or extrusion of the mixture whereby the desired catalytic material is obtained in the form of pellets or rods which may be broken into the desired size. Some variation in the details of this method of preparation may be necessary in view of the differences in character of the materials from which the supporting materials are derived. In the use of asphalts as a source of supporting material, the asphalt may be ground up and mixed with the pyrophosphate and thereafter formed into pellets. Prior to use the resulting product may be heated at elevated temperature to effect conversion of the asphalt to a harder carbonaceous structure. Alternatively, the asphalt may be dissolved in a suitable substance such as naphtha, and the resulting solution may then be employed for effecting the desired mixture of asphalt and pyrophosphate after which the solvent may be driven off, for example, by heating. The same procedure may be followed in the use of similar substances such as refinery sludges.

Prior to use refinery sludges may be water washed to remove undesirable acidic impurities. Washing may be accomplished by heating the sludge in a molten condition under water and decanting off the water. In the use of tars such as acid tars washing should be carried out prior to admixture thereof with the pyrophosphate. Washing of acid and tars may be effected by dissolving the tar in a solvent such as benzene after which the solution is thoroughly washed with dilute acid and water to remove inorganic impurities. The solution may then be used as such or after evaporation of the solvent. In the use of high melting point carbonaceous materials such as asphalts and sludges it may be desirable to heat the mixture to a temperature sufficient to effect coking or carbonization of the material, or if the melting point is sufficiently high, to effect coalescence of the particles of asphalt, etc., whereby a firm structure is obtained.

In the use of easily decomposable materials such as sugars as a source of supporting material some variation in the details and preparation may be necessary, depending upon the relative proportion of supporting material desired in the catalytic contact material. In the production of contact material containing a relatively small amount of the sugar carbon the source material, such as sucrose, may be admixed directly with the supporting material and formed into pellets. The pellets may then be heated to effect charring of the sucrose. In the production of contact materials containing larger amounts of the supporting material it may be desirable to caramelize the sucrose and thereafter admix with it the desired pyrophosphate in the proportion necessary. The resulting mixture is then further heated to effect charring and the resulting mass may then be granulated. With the use of intermediate amounts of the sucrose it may be admixed directly with the pyrophosphate and formed into pellets. In heating the pellets thereafter to effect charring of the sucrose there may be adhesion of the pellets due to the puffing caused by the charring of the sucrose. However, the resulting material may be granulated without excessive loss of fine material. Any fine material remaining can be incorporated in a succeeding batch.

In preparing the catalytic contact material by methods which involve the precipitation of the metal pyrophosphate it is desirable in connection with certain of the pyrophosphates, particularly copper pyrophosphate, to employ the reagents such as a soluble pyrophosphate and a soluble copper salt in proportions such that there is no excess of the soluble pyrophosphate over the amount necessary to react with all the metal salt present. Preferably, an excess of the metal salt is employed. This precaution is necessary because certain of the soluble pyrophosphates, such as sodium pyrophosphate, form double salts with copper pyrophosphate and the metal pyrophosphates. The presence of such double salts appears to retard during the conversion treatment reduction of the metal pyrophosphates to the active form. In observing such precautions it is desirable to effect thorough mixing of the solutions, and it is advantageous to mix the solutions by pouring the solution of the soluble pyrophosphate into the metal salt solution whereby there is maintained during the precipitation reaction an excess of the metal salt.

In carrying out the conversion process by means of the improved catalytic contact material the gases or other hydrocarbon fluid suitably preheated are passed in contact with the catalytic contact material in a suitable chamber or reactor. Any suitable pressure may be used, but it is preferable to employ relatively high pressures, for example, in excess of 150 pounds per square inch although atmospheric pressure or lower pressures may be employed. The rate of polymerization of the olefinic hydrocarbons is a function of the concentration of these materials, and accordingly for maximum conversion such reactions are best run at superatmospheric pressure. The use of relatively high pressures apparently also has a beneficial effect on the granular contact material by assisting in preserving its original form whereby operating runs of longer duration are possible. Ordinarily, pressures of at least 500 pounds per square inch are to be preferred.

The optimum reaction temperature depends somewhat upon the method and material under treatment and the product desired. For example, conversion of gaseous olefins at a temperature of approximately 300° to 400° F. is advantageous for effecting maximum conversion to a gasoline product. In the treatment of a gaseous mixture containing substantial quantities of propylene a temperature of 400° F. or higher is desirable for effecting substantial conversion.

The extent of reaction and the character of the liquid product are effected also by the length of reaction time during which the charge remains in contact with the contact material under the operating conditions. In general, the hydrocarbons should be passed over the contact material at a rate of 2 to 50 cubic feet (measured as gas at standard conditions of temperature and pressure) per pound of contact material per hour. Otherwise expressed, the hydrocarbon fluid may be passed through the reactor at a rate of 50 to 6000 volumes per hour per volume of catalytic contact material, depending upon the apparent density of the contact material. For material having an apparent density of about 0.5 this range should be about 60 to 1500 volumes per volume of contact material per hour.

It is apparent that for any given charge the extent of reaction and the character of the liquid product depend mainly upon the operating pressure, the operating temperature and the space velocity of the charge. Many combinations of these variables will yield the desired amount and quality of product. For example, in the treatment of a gaseous mixture containing substantial proportions of isobutylene it may be desirable to operate at a relatively low temperature or with a relatively great space velocity or both in order to limit the extent of conversion whereby the product consists largely of the polymers of isobutylene and therefore after hydrogenation has a relatively high octane number. Within the range of operating temperatures preferred in the present process (300° F. to 600° F.) isobutylene is more readily polymerized than normal butylenes or propylene whereby selective polymerization may be effected by limiting the extent of conversion as described. Naturally, more complete coversion may be effected by raising the temperature or reducing the space velocity or both.

The moisture content of the reaction mixture apparently has no direct effect on the reaction. A saturated charge apparently has a slight beneficial effect in maintaining the original condition of the contact material. There is no necessity, therefore, for complete drying of the charge to the process.

The invention will be further described by reference to specific examples wherein certain pyrophosphates are employed in connection with certain supporting materials. It is to be understood, however, that such examples are intended merely to illustrate the application of the invention and are not intended to limit the scope of the invention which includes the use of other active metal pyrophosphates and other suitable supporting materials. The examples furthermore relate particularly to the treatment of normally gaseous hydrocarbon mixtures containing gaseous olefins. It is to be understood, however, that the invention is not limited to the treatment of normally gaseous olefinic hydrocarbons but is applicable to the treatment of normally liquid olefinic hydrocarbons or mixtures of gaseous and liquid olefinic hydrocarbons.

Example I 50 grams of granular activated charcoal (6-12 mesh) are immersed in a solution of sodium pyrophosphate made by dissolving 111.5 grams of $Na_4P_2O_7.10H_2O$ in 1000 cc. of water. Suction is applied and released several times in order to impregnate the charcoal with the sodium pyrophosphate solution. In this manner about 60 cc. of the solution are absorbed. The impregnated charcoal is then dried, for example, overnight and then immersed in a mercuric acetate solution made by dissolving 159.33 grams of

$Hg(C_2H_3O_2)_2$ in 400 cc. of hot water. The vacuum is applied and released several times and the charcoal is then allowed to stand in contact with the mercuric acetate solution for several hours. Thereafter the charcoal is filtered out of the solution and dried, for example, at 220° F. for 24 hours. The mercuric pyrophosphate should be deposited in and upon the charcoal granules to an extent sufficient to provide a content thereof of about 25% in the finished catalytic contact material. If necessary in order to obtain this degree of deposition further impregnation may be employed. Further impregnation of the charcoal to increase the amount of mercuric pyrophosphate contained therein may be effected by repeated immersion in the sodium pyrophosphate and mercuric acetate solutions preferably after drying. Special precautions to avoid formation of the double salt are not necessary in the preparation of mercuric pyrophosphate since this pyrophosphate apparently does not form the double salt with sodium pyrophosphate.

Catalytic contact material prepared in accordance with Example I exhibits a catalytic activity substantially as great as that of the mercuric pyrophosphate alone and retains its granular form throughout the active life of the contact material.

Example II 80 grams of copper pyrophosphate, prepared in a form free of the double salt as described above and 20 grams of a cooked refinery sludge are ground together and the mixture made into ⅛ inch pellets. The pellets are baked at 500° F. for 24 hours in a stream of wet nitrogen, saturated with water vapor at 133° F. by passing it through water at that temperature. Prior to use the refinery sludge may be water washed by covering it with water and applying heat until the sludge is melted. The mixture is then stirred and allowed to cool until the sludge solidifies. Thereafter the water is decanted off. This procedure may be repeated until the wash water is neutral in reaction to litmus paper. Thereafter the sludge is dried at 220° F. to remove remaining water. Granular contact material thus prepared has a catalytic activity as great as copper pyrophosphate alone and exhibits a substantially improved granular strength and resistance to disintegration during the conversion treatment.

Example III 80 grams of copper pyrophosphate and 20 grams of a propane precipitated asphalt from Mid-Continent stock having a melting point of 210°-214° F. are ground together and made into ⅛ inch pellets. These may be charged directly into the reactor without any heat treatment or may be heated 24 hours in a stream of wet nitrogen at 500° F. as described in connection with Example II. Catalytic material thus prepared has an activity as great as that of the copper pyrophosphate alone and exhibits improved granular strength and resistance to disintegration during the conversion treatment.

Example IV 75 grams of copper pyrophosphate and 59.5 grams of sucrose are mixed together and made into ⅛ inch pellets. The pellets are baked for 24 hours at 500° F. in a stream of moist nitrogen (water saturated at 133° F.). Decomposition of the sucrose results in the formation of froth which decomposes to carbon and causes the pellets to adhere to each other. Gentle crushing is necessary to convert the mass to the desired granular form. As an example of the use of catalytic contact material prepared in accordance with this invention the results obtained by the use of material produced in accordance with this example for promoting polymerization of olefins may be specifically cited. In this test the catalytic material prepared in accordance with this example was employed in the conversion treatment of a hydrocarbon gas consisting of approximately 15% isobutylene, 27% normal butylene and 58% butane by weight. The dry gas was passed through the granular catalytic contact material under a pressure of 1400 pounds per square inch at a rate of approximately 36 cubic feet (measured as gas at standard conditions of temperature and pressure) per pound of catalytic contact material (or 1500 volumes per hour per volume of contact material) per hour. At a reaction temperature of 350° F. the product contained approximately 37% of liquid by weight. After the production of approximately 35 gallons of liquid per pound of catalyst the conversion treatment was terminated arbitrarily, and the catalytic contact material was recovered in granular form.

Example V 80 grams of copper pyrophosphate and 47.6 grams of sucrose are formed into catalytic contact material in accordance with the method of Example IV. As an example of the use of the improved catalytic contact material of the present invention for the conversion treatment of a gas containing propylene specific results in the testing of the catalytic contact material prepared in accordance with this example may be cited. Catalytic contact material thus prepared was employed in the treatment of a hydrocarbon gas containing approximately 21% propylene, 19% propane, 8% isobutylene, 15% normal butylene and 37% butane by weight. The dry gas was passed through the granular catalytic contact material at a rate of approximately 13 cubic feet (measured as gas at standard conditions of temperature and pressure) per pound of catalytic contact material per hour (570 volumes per volume of contact material per hour) under a pressure of 1400 pounds per square inch. At a reaction temperature of 400° F. the product contained approximately 38 per cent of liquid by weight. During the course of the test run in question the operating temperature was varied for experimental purposes with temperatures as high as 450° F. After the production of 22 gallons of liquid per pound of catalytic contact material employed the conversion treatment was terminated and the greater part of the catalytic contact material was recovered in granular form.

Example VI

To compare the effect of the supporting materials employed in accordance with the present invention upon the catalytic activity of the pyrophosphates with the similar effect of other supporting materials previously proposed for use in connection with polymerization catalysts, reference may be had to tests of a contact material prepared by mixing 50 grams of copper pyrophosphate with 12½ grams of activated alumina, which was ground to pass a 20 mesh screen before being mixed with the copper pyrophosphate. The resulting mixture was made into ⅛ inch pellets. The granular material thus prepared was employed in a test involving conditions substantially like those employed in the test referred to in Example IV in the treatment of a gas consisting of 27% normal butylene, 13% isobutylene and 60% butane. The dry gas was passed through the contact material at a rate of approximately 36 cubic feet (measured as gas at standard conditions of temperature and pressure) per pound of contact material per hour (or 1960 volumes per hour per volume of contact material). At a reaction temperature of 350° F. the product contained approximately 23 per cent of liquid by weight. This rate is substantially lower than would be obtained in the use of a similar quantity of the copper pyrophosphate alone under similar operating conditions in contradistinction to the results obtained in the test described under Example IV wherein the yield of liquid product was substantially the same as would be obtained by a similar quantity of copper pyrophosphate. These test results indicate clearly that the use of activated alumina as a support resulted in a loss of activity of the catalytic material employed probably through reaction of the alumina with the active modification of the copper pyrophosphate.

This conclusion is borne out by a consideration of the results obtained in a test of a mixture of 50 parts of activated alumina and 50 parts of copper pyrophosphate formed into pellets in the manner described above. This material was tested in the treatment of a gas consisting of 27 per cent normal butylene, 16 per cent isobutylene and 57 per cent butane. The dry gas was passed over the contact material at a rate of approximately 36 cubic feet (measured as gas at standard conditions of temperature and pressure) per pound of contact material per hour (or 2130 volumes per hour per volume of catalytic material) under a pressure of 1400 pounds per square inch. At a reaction temperature of 350° F. the product contained approximately 13% of liquid by weight. At a reaction temperature of 400° F. the product contained approximately 17% of liquid by weight. The further loss of activity of the copper pyrophosphate as indicated by these results following the use of a larger proportion of activated alumina as the contact material emphasizes the deleterious effect of this material. The difference in activity of the two contact materials containing activated alumina as a support cannot be ascribed to the difference in the content of copper pyrophosphate since a copper pyrophosphate content of 50 per cent is ample in a properly prepared contact material to provide an activity as great as granular material consisting only of the copper pyrophosphate.

Example VII

The deleterious effect of certain types of supporting materials on the activity of the pyrophosphates is further illustrated by reference to tests of contact material including as supporting material 25 per cent of an acid treated clay (manufactured under the trade name of Super Filtrol). In the production of this material three parts of copper pyrophosphate and one part clay were intimately mixed and made into ⅛ inch pellets. The granular material thus obtained was employed in the treatment of a gas consisting of 27 per cent normal butylene, 16 per cent isobutylene and 57 per cent butane. The dry gas was passed through the contact material at a rate of approximately 36 cubic feet (measured as gas at standard conditions of temperature and pressure) per pound of contact material per hour (or 1800 volumes of contact material per hour) under a pressure of 1400 pounds per square inch. At a reaction temperature of 350° F. the liquid product contained approximately 10% of liquid by weight. By raising the reaction temperature to 425° the proportion of liquid in the product was raised temporarily to approximately 25%, but the extent of conversion declined after a short time at this temperature, indicating a gradual loss of activity of the copper pyrophosphate probably due to the reaction of the clay with the active modification of the copper pyrophosphate.

Example VIII

Kieselguhr also is unsuitable as a supporting material for the active pyrophosphates, as is shown by the results obtained in the testing of the contact material made up in the manner described in Example VI of a mixture of equal quantities of copper pyrophosphate and kieselguhr. The contact material thus prepared was tested under the same conditions as in Example VII. At a reaction temperature of 350° F. the product contained approximately 13% of liquid by weight. Raising the temperature to 400° F. provided a slight but temporary increase in the rate of conversion which thereafter declined relatively rapidly.

*Example IX*

Oxides are generally unsuitable as supporting materials for the active pyrophosphates, as is shown by the following results of testing of a contact material consisting of three parts of copper pyrophosphate and one part of magnesium oxide. The materials were formed into contact material in the manner described under Example VI and were tested under conditions substantially identical with those of Example VII. Under such conditions the maximum conversion rate was obtained by raising the temperature to 400° F. at which point the product contained approximately 12% of liquid by weight. Thereafter there was a rapid decrease in the extent of conversion which could not be offset by raising the temperature further.

The foregoing examples illustrate the importance of the selection of a contact material which will not react with the active modification of the pyrophosphate employed. Materials which meet such a requirement and are otherwise suitable are listed above. The selection of materials other than those listed and capable of reacting with the active modification (reduction products of the pyrophosphates) may effect an improvement in the strength of the contact material, but this will be at the expense of the activity of the pyrophosphate employed. The use of supporting materials selected from the foregoing list of suitable materials effects, on the other hand, substantial improvement in the strength of the contact material without impairing the catalytic activity of the pyrophosphate. The invention thus provides an improved catalytic contact material, the employment of which makes possible operating runs of longer duration at the same rates of conversion as would be obtained in the presence of a granular catalytic material consisting only of the active pyrophosphates.

We claim:

1. The method of converting low boiling olefinic hydrocarbons to higher boiling hydrocarbons within the gasoline boiling range which comprises contacting said olefinic hydrocarbons at elevated temperature with a granular catalytic contact material consisting essentially of an intimate mixture of at least one pyrophosphate, selected from the pyrophosphates of metals of the group consisting of copper, mercury, zinc, magnesium, iron, aluminum and cobalt, and carbonaceous supporting material, the said catalytic material being substantially free from extraneous phosphoric acids and alumina, silica, clays and other materials reactive with the reduction products of said metal pyrophosphates.

2. The method of converting low boiling olefinic hydrocarbons to higher boiling hydrocarbons within the gasoline boiling range which comprises contacting said olefinic hydrocarbons at elevated temperature with a granular catalytic contact material consisting essentially of an intimate mixture of at least one pyrophosphate, selected from the pyrophosphates of metals of the group consisting of copper, mercury, zinc, magnesium, iron, aluminum and cobalt, and activated charcoal, the said catalytic material being substantially free from extraneous phosphorous acids and alumina, silica, clays and other materials reactive with the reduction products of said metal pyrophosphates.

3. Granular contact material for promoting the polymerization of olefinic hydrocarbons essentially consisting of an intimate mixture of at least one pyrophosphate selected from the pyrophosphates of metals of the group consisting of copper, mercury, zinc, magnesium, iron, aluminum and cobalt, and carbonaceous supporting material, the said catalytic material being substantially free from extraneous phosphoric acids and alumina, silica, clays and other materials reactive with the reduction products of said metal pyrophosphates.

4. Granular contact material for promoting the ploymerization of olefinic hydrocarbons essentially consisting of an intimate mixture of at least one pyrophosphate selected from the pyrophosphates of metals of the group consisting of copper, mercury, zinc, magnesium, iron, aluminum and cobalt, and activated charcoal, the said catalytic material being substantially free from extraneous phosphoric acids and alumina, silica, clays and other materials reactive with the reduction products of said metal pyrophosphates.

5. The method of converting low boiling olefinic hydrocarbons to higher boiling hydrocarbons within the gasoline boiling range which comprises contacting said olefinic hydrocarbons at elevated temperature with a granular catalytic contact material consisting essentially of a mixture of copper pyrophosphate and carbonaceous supporting material, the said catalytic material being substantially free from extraneous phosphoric acids and alumina, silica, clays and other materials reactive with the reduction products of said copper pyrophosphate.

6. Granular contact material for promoting the polymerization of olefinic hydrocarbons essentially consisting of an intimate mixture of copper pyrophosphate and carbonaceous supporting material and substantially free from extraneous phosphoric acids and alumina, silica, clays and other materials reactive with the reduction products of said copper pyrophosphate.

7. The method of claim 1 wherein said metal pyrophosphate is mercury pyrophosphate.

8. The method of claim 1 wherein said metal pyrophosphate is cobalt pyrophosphate.

EDWIN T. LAYNG.
LOUIS C. RUBIN.
ROBERT F. RUTHRUFF.